July 20, 1943. M. W. BARNES 2,324,553
HEATING OF FLUIDS
Filed Nov. 8, 1940 4 Sheets-Sheet 1

INVENTOR
MARION W. BARNES
BY Lee J Gary
ATTORNEY

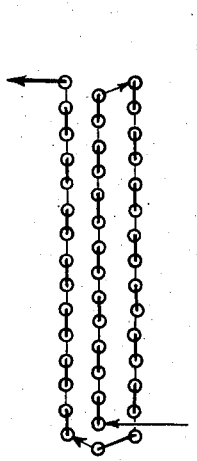 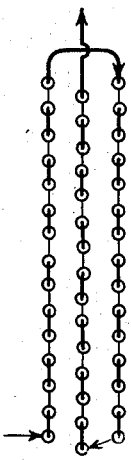 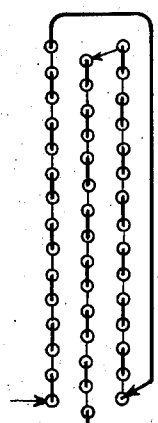 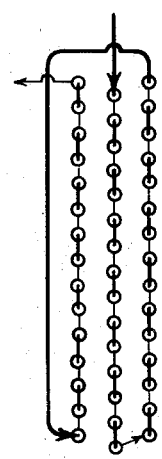
FIG. 2　　FIG. 3　　FIG. 4　　FIG. 5
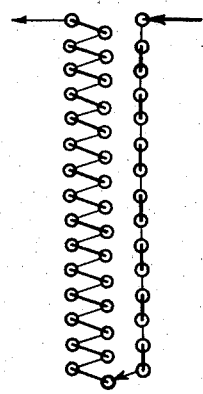
FIG. 6

Patented July 20, 1943

2,324,553

UNITED STATES PATENT OFFICE 2,324,553

HEATING OF FLUIDS

Marion W. Barnes, Chicago, Ill., assignor to Universal Oil Products Company, Chicago, Ill., a corporation of Delaware Application November 8, 1940, Serial No. 364,832

4 Claims. (Cl. 122—356)

This invention relates to an improved form of heater and to an improved method of heating which may be accomplished therein. The invention is particularly advantageous as applied to heating fluid hydrocarbons to the high temperatures required for their conversion, although the invention is not restricted to this particular use since it will find numerous other advantageous applications.

The heater herein provided is of the general type now well known in the art, wherein flames and hot gases resulting from the combustion of fuel are passed upwardly or downwardly over the surface of spaced, substantially vertical refractory walls, heating the same to a highly radiant condition, heat being transmitted by radiation from the refractory walls and directly from the flames and hot gases to a fluid conduit disposed centrally between said walls. In the improved form of heater herein provided, said fluid conduit comprises three vertically parallel rows of horizontally disposed tubes, the tubes in adjacent rows being so arranged that the outer side of each of the tubes in the two outside rows receives heat directly by radiation from the adjacent refractory wall and the flames and hot combustion gases passing thereover, while opposite sides of each of the tubes in the middle row receive heat by radiation from the flames, hot gases and refractory walls at a reduced rate due to the partial shielding effect of the tubes in the two outer rows. With this arrangement, by varying the sequence of flow through the three rows of tubes and/or by varying firing conditions on opposite sides of the fluid conduit, a wide variety of heating curves are obtainable and may be selected to suit the requirements of the particular type of fluid undergoing treatment.

The accompanying diagrammatic drawings illustrate several specific forms of heaters, each of which embody features of the invention.

Fig. 1 of the drawings is a cross-sectional elevation of a single cell down-fired heater of the improved form provided by the invention.

Figs. 2 to 6 inclusive illustrate specific flows which may be employed in the three-row radiantly heated tube bank of a heater of the improved type provided by the invention.

Figure 1:
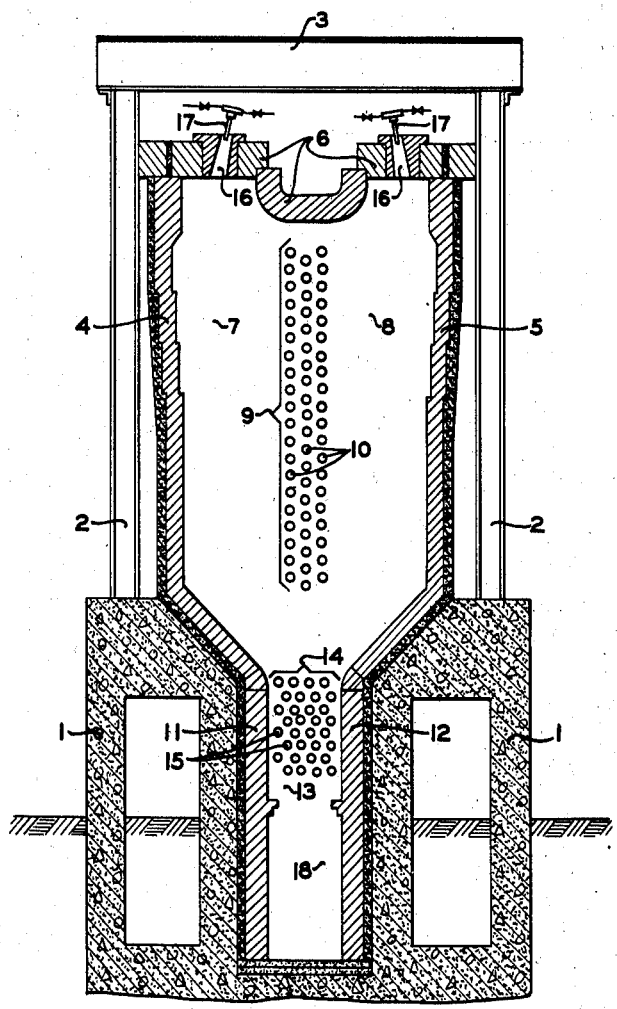

Referring to Fig. 1, the single cell down-fired heater here illustrated has a foundation designated by the reference numeral 1 on which a plurality of steel columns 2, supporting steel beams 3, are mounted. The steel framework supports the refractory shapes of side walls 4 and 5 and roof 6 in any conventional manner not pertinent to the invention and not here illustrated.

The substantially vertical portions of the side and end walls of the heater, which latter do not appear in this particular view, define combustion and radiant heating zones 7 and 8 which are disposed between the respective side walls 4 and 5 and fluid conduit 9. The latter is located substantially midway between walls 4 and 5 and comprises three vertically parallel rows of horizontally disposed tubes 10 with the adjacent tubes in the several rows arranged in staggered formation, as illustrated.

At their lower ends, the side walls 4 and 5 slope inwardly to connect with the side walls 11 and 12 of fluid heating zone 13 disposed beneath and in substantially vertical alignment with fluid conduit 9. Another fluid conduit 14 comprising, in the case here illustrated, a plurality of superimposed horizontal rows of horizontally disposed tubes 15 is located within fluid heating zone 13.

A row of firing ports 16 is provided in the roof of the furnace adjacent each of the side walls 4 and 5 and corresponding rows of burners 17 supply fuel and air to the combustion and heating zones 7 and 8 through firing ports 16. The burners and firing ports are so arranged that flames and hot gases resulting from combustion of the fuel are directed in a substantially continuous sheet downwardly over the refractory surfaces of walls 4 and 5, heating the latter to a highly radiant condition and keeping fluid conduit 9 out of the direct path of flow of the flames and hot combustion gases.

The tubes of fluid conduit 9 receive heat by direct radiation from the flames, hot combustion gases and radiant side walls of the heater. Since the tubes in the central row of bank 9 are partially shielded by the tubes in the two outer rows, they are subjected to less intense heating than the tubes in the outer rows and, by varying the sequence of flow of the fluid undergoing heating through the three rows of bank 9 and/or by varying the firing conditions employed on opposite sides of the heater, a wide variety of heating curves is obtainable and the type of heating curve obtained may be selected to suit the requirements of the particular type of fluid undergoing treatment.

The combustion gases, which have given up a major portion of their radiant heat to the tubular elements of bank 9, pass from the combustion and heating zones 7 and 8 through fluid heating zone 13 to flue 18 wherefrom they may pass to a suitable stack, not illustrated. The combustion gases flowing through zone 13 intimately contact the tubes of bank 14 and supply heat to the latter and to the fluid passing therethrough.

Referring now to Figs. 2 to 6 inclusive, which illustrate some of the many possible variations of flow which may be employed in tube bank 9 of Fig. 1; in all but Fig. 6 adjacent tubes in each individual row are connected at their ends in series by means of suitable return bends of any conventional form, not illustrated. The lines and arrows in each of the figures indicate the general path and direction of flow through the various rows.

In Fig. 2 the fluid to be heated enters the next to the lowermost tube of the central row, flowing through in series the remaining higher tubes in this row in a general upward direction, is transferred to the uppermost tube in one of the outer rows, flows downwardly in series through the tubes of this row and is transferred from the lowermost tube thereof, through the bottom tube of the central row to the lowermost tube of the other outside row, passes upwardly in series through the tubes of the latter and is discharged from the uppermost tube thereof.

In Fig. 3, the fluid to be heated enters the lowermost tube of one of the outside rows, flows upwardly in series through the tubes of this row and thence downwardly in series through the tubes of the other outside row and is thence transferred to the lowermost tube of the central row and flows upwardly in series through the tubes of this row to be discharged from the uppermost tube thereof.

In Fig. 4, the fluid to be heated enters the lowermost tube of one of the outside rows, flows upwardly in series through the tubes of this row and is transferred from the uppermost tube thereof to the lowermost tube of the other outside row, flowing upwardly in series through the tubes thereof to the uppermost tube of the central row and thence downwardly in series through the tubes of the central row to be discharged from the lowermost tube thereof.

In Fig. 5, the fluid to be heated enters the uppermost tube of the central row, flows downwardly in series through the tubes thereof to the lowermost tube of one of the outside rows, passes upwardly in series through the tubes of this outside row and is transferred from the uppermost tube thereof to the lowermost tube of the other outside row, flowing upwardly in series through the tubes thereof to be discharged from the uppermost tube of this row.

In Fig. 6, adjacent tubes in the central and one outside row are connected at their ends in series, while adjacent tubes in the other outside row are connected in series at their ends so that series flow is obtained through the tubes of one outside row while the fluid flowing through the other outside row and central row passes first through a tube in said other outside row, thence through the next adjacent tube in the central row, thence through the next adjacent tube in said other outside row, and so on throughout these two rows. In the case here illustrated, the fluid to be heated passes in a downwardly direction through the outside row wherein the tubes are connected in series and thence passes in an upwardly direction through the tubes of the other outside row and central row in the manner above described.

In any of the Figs. 2 to 6 inclusive, the sequence and general direction of flow through the various rows may be exactly reversed. A clear picture of the reverse flows may be obtained by simply reversing the direction of the arrows in each of these figures. Many other possible variations will be apparent to one familiar with the art, in view of the variations illustrated in Figs. 2 to 8 inclusive. For example, the general sequence of flow through the various rows may be preserved while employing either upward or downward flow in any individual row, as desired.

With heaters of the general type herein provided, the independent control of the quantity of fuel supplied to the combustion and heating zones permits maintaining substantially identical conditions in both of these zones or employing more severe or less severe conditions in one zone as compared with those employed in the other. Also, by varying the quantity of excess air supplied to each combustion and heating zone, the heating conditions may be varied from top to bottom of each zone. It will thus be apparent that by selecting the proper flow through the radiantly heated tube bank and by control of the heating conditions in the combustion and heating zones on opposite sides of this bank, any desired type of heating curve may be obtained and the type of heating curve obtained may be controlled to suit requirements. This is particularly advantageous as applied to the heating of hydrocarbon oils of various types to the high temperatures required for their pyrolytic conversion, since the heating curve employed is often a critical factor in obtaining the optimum rate and degree of conversion.

Figure 7:
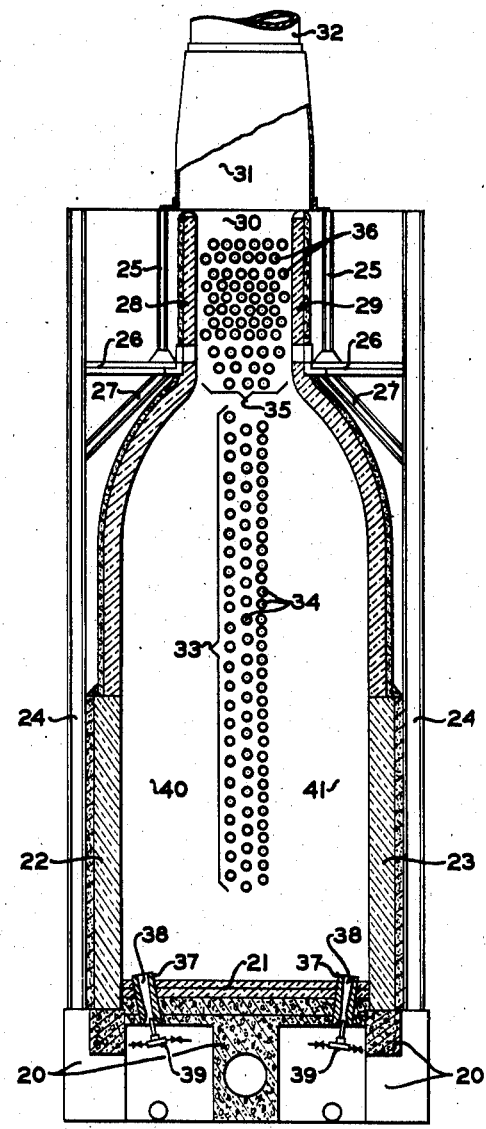
Fig. 7 is a cross-sectional elevation of a single cell up-fired heater embodying features provided by the invention.

Referring now to Fig. 7, the heater here illustrated is similar in many respects to that illustrated in Fig. 1 except that it is fired in an upward direction rather than a downward direction, the position of the fluid heating zone and the tube bank disposed therein being above rather than below the three-row bank of radiantly heated tubes.

The up-fired single cell heater shown in Fig. 7 has a foundation 20 upon which floor 21 and side walls 22 and 23 rest. In this particular case, as in Fig. 1, a steel framework comprising columns 24 and auxiliary members 25, 26 and 27 serve as means from which the shapes which form the refractory walls of the heater are suspended in any conventional manner, not illustrated.

The side walls 22 and 23 curve inwardly at their upper ends and connect with side walls 28 and 29 of fluid heating zone 30 above which a flue 31 and stack 32 are mounted and supported from the steel framework.

A fluid conduit or tube bank 33 comprising three vertically parallel rows of horizontally disposed tubes 34 is disposed substantially midway between the side walls 22 and 23 of the heater.

Another fluid conduit or tube bank 35 is provided within fluid heating zone 30 and, in the case here illustrated, comprises a plurality of superimposed horizontal rows of horizontally disposed tubes 36.

A row of burner blocks 37 having firing ports 38 is provided in the floor of the heater adjacent each of the refractory side walls 22 and 23 and corresponding rows of burners 39 supply fuel and air upwardly into combustion and heating zones 40 and 41 disposed on opposite sides of tube bank 33. As in Fig. 1, the flames and combustion gases are directed in a substantially continuous sheet over the surface of the refractory side walls and heat the same to a highly radiant condition, tube bank 33 being disposed out of the direct path of flow of the flames and hot combustion gases and the tubes of this bank and the fluid passing therethrough being supplied with radiant heat from the side walls and from the flames and hot combustion gases.

The combustion gases, which have given up a major portion of their radiant heat to the tubular elements of bank 33, pass from combustion and heating zones 40 and 41 through fluid heating zone 30 wherein they directly contact and supply heat to the tubular elements of bank 35. They are thence directed through flue 31 to stack 32.

In tube bank 33 of Fig. 7, as in tube bank 9 of Fig. 1, any of the flows illustrated in Figs. 2 to 6 inclusive, as well as any of the possible variations thereof, such as above mentioned, may be utilized.

In Figs. 1 and 7, any desired flow may be employed in tube banks 14 and 35 and usually the fluid undergoing heating will be passed through the tube bank in the fluid heating zone prior to its introduction into the three-row radiantly heated tube bank.

Figure 8:
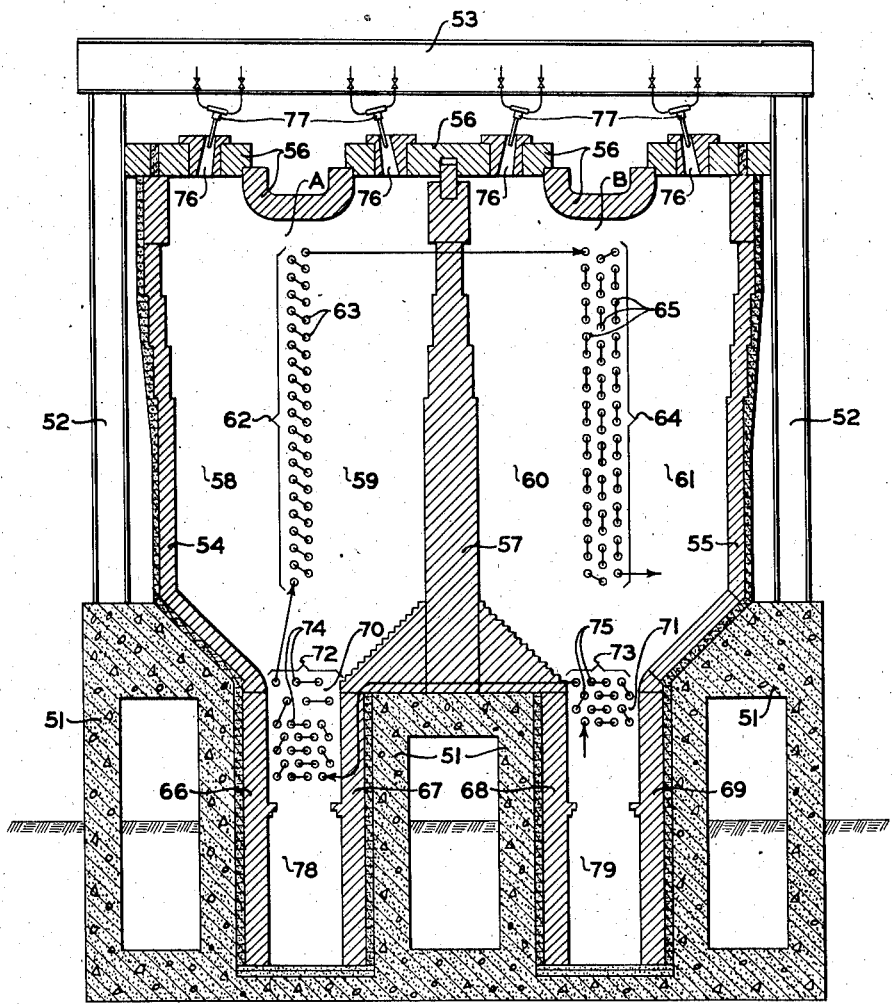
Fig. 8 is a cross-sectional elevation of a two-cell down-fired heater embodying the features of the invention.

Referring now to Fig. 8, the two-cell downfired heater here illustrated has a foundation 51 on which a plurality of steel columns 52, supporting steel beams 53, are mounted. The refractory shapes which form the side walls 54 and 55 and the roof 56 of the heater are suspended from the steel framework in any conventional manner, not illustrated.

A vertical refractory wall 57 resting on the foundation and extending between the end walls and to the roof of the heater is disposed substantially midway between the side walls 54 and 55 and divides the interior of the upper portion of the heater into cells A and B. Cell A of the heater comprises combustion and heating zones 58 and 59 disposed, respectively, between side wall 54 and fluid conduit 62 and between wall 57 and conduit 62. Cell B of the heater comprises combustion and heating zones 60 and 61 disposed, respectively between wall 57 and conduit 64 and between side wall 55 and conduit 64.

The opposite sides of wall 57 slope inwardly and upwardly at its lower end and walls 54 and 55 slope outwardly and upwardly at their lower ends. The walls of cell A converge with walls 66 and 67 of fluid heating zones 70 disposed substantially midway between and beneath combustion and heating zones 58 and 59 and the walls of cell B converge with side walls 68 and 69 of fluid heating zone 71 disposed substantially midway between and beneath combustion and heating zones 60 and 61.

Fluid conduit 62 of cell A comprises, in the case here illustrated, two vertically parallel rows of horizontally disposed tubes 63 with the tubes in opposite rows arranged in staggered formation.

Fluid conduit 64 of cell B comprises three vertically parallel rows of horizontally disposed tubes 65 with the adjacent tubes in the several rows arranged in staggered formation.

A fluid conduit 72 comprising, in the case here illustrated, a plurality of superimposed horizontal rows of horizontally disposed tubes 74 is located within fluid heating zone 70 and another fluid conduit 73 which, in the case here illustrated, comprises a plurality of superimposed horizontal rows of horizontally disposed tubes 75 is located within fluid heating zone 71.

A row of firing ports 76 is provided in the roof of the heater adjacent each of the side walls 54 and 55 and adjacent opposite sides of the central wall 57. Corresponding rows of burners 17 supply fuel and air to each of the combustion and heating zones 58, 59, 60 and 61. The burners and firing ports are so arranged that flames and hot combustion gases resulting from the combustion of the fuel are directed in a substantially continuous sheet downward over the inner faces of the refractory side walls 54 and 55 and downwardly over opposite faces of the refractory central wall 57, heating these refractory surfaces to a highly radiant condition and keeping fluid conduits 62 and 64 out of the direct path of flow of the flames and hot combustion gases.

Each of the tubular elements 63 of fluid conduit 62 receives heat on both sides by radiation from the fired walls of cell A and directly from the flames and hot combustion gases passing downwardly thereover. Each of the tubular elements 65 of fluid conduit 64 is exposed to heating by radiation from the fired walls of cell B and directly from the flames and hot combustion gases passing downwardly thereover. However, since the tubes in the central row of bank 64 are partially shielded by the tubes in the two outer rows, they are subjected to less intense heating than the tubes in the outer rows and, as previously explained in conjunction with the other figures of the drawings, by varying the sequence of flow of the fluid undergoing heating through the rows of tube banks 62 and 64 and/or by varying the firing conditions employed in the combustion and heating zones 58, 59, 60 and 61, a heating curve of any desired type may be obtained and may be selected to suit the requirements of the particular type of fluid undergoing treatment.

The combustion gases, which have given up a major portion of their radiant heat to the tubular elements of bank 62, pass from combustion and heating zones 58 and 59 through fluid heating zone 70 wherein they contact and supply heat to the tubular elements 74 of bank 72 and to the fluid passing therethrough. From zone 70, the combustion gases pass through flue 78 to a suitable stack, not illustrated.

The combustion gases, which have given up a major portion of their radiant heat to the tubular elements of bank 64, pass from combustion and heating zones 60 and 61 through fluid heating zone 71 wherein they contact and supply heat to the tubular elements 75 of bank 73 and to the fluid passing therethrough. From zone 71, the combustion gases pass through flue 79 to a suitable stack, not illustrated.

In the particular case here illustrated, the flow through the fluid conduits of Fig. 8 is as follows: The fluid to be heated enters the lowermost row of tube bank 73, passing in series through the adjacent tubes in each row and in series through the adjacent rows in a general upward direction. It is then transferred to the lowermost row of tube bank 72 and passes therethrough in a similar manner. It is thence supplied to the lowermost tube of bank 62 and flows in series through the adjacent tubes in opposite rows of this bank in a general upward direction and is thence transferred to the uppermost tube of one of the outer rows of bank 64. It passes downwardly in series through the adjacent tubes of this row, thence upwardly in series through the adjacent tubes of the middle row of bank 64 and finally downwardly in series through the adjacent tubes of the other outside row of bank 64 to be discharged from the lowermost tube of this row.

The particular flow illustrated in Fig. 8 may be employed to advantage, for example, in heating light hydrocarbon oil distillate, such as gasoline or gasoline fractions of inferior antiknock value or the like, under conditions regulated to produce high yields of good antiknock gasoline therefrom. Substantially uniform firing conditions are employed in zones 58 and 59 and considerably milder, substantially uniform firing conditions are employed in zones 60 and 61. In passing through tube banks 73 and 72, the oil is heated to below an active cracking temperature and in passing thence through tube bank 62 it attains substantially the maximum temperature to which it is subjected at or near the outlet end of this bank. Tube bank 64 comprises a soaking section wherein the highly heated oil is maintained for a predetermined time at or near the maximum temperature previously encountered.

It will, of course, be understood that any of the flows illustrated in Figs. 2 to 6 inclusive or any of the modifications thereof mentioned may be employed in the tube bank 64 of the heater illustrated in Fig. 8. Tube bank 64, together with tube bank 73, may be utilized, when desired, for heating a separate stream of fluid of different characteristics than that supplied to tube banks 72 and 62, or the same stream of fluid may be passed through all of the tube banks in any desired sequence. Also, variations of the flow illustrated in tube bank 62 may be employed within the scope of the invention or, when desired, a single row or a triple-row tube bank may be employed in this zone in place of that illustrated.

I claim as my invention:

1. A heater for fluids comprising, in combination, refractory side and end walls defining a combustion and heating chamber, a fluid conduit comprising three vertically parallel, serially connected rows of horizontal tubes disposed substantially midway between said walls within said chamber, and means for directing flames and hot gases resulting from the combustion of fuel over the inner surfaces of said refractory side walls in a substantially vertical direction through said chamber, each of the tubular elements of said fluid conduit being exposed to heating by radiation from said flames and hot gases and from said refractory side walls.

2. A heater for fluids comprising, in combination, refractory side and end walls defining a combustion and heating chamber, a fluid conduit comprising three vertically parallel rows of horizontal tubes disposed substantially midway between said walls within said chamber, and means for directing flames and hot gases resulting from the combustion of fuel over the inner surfaces of said refractory side walls in a substantially vertical direction through said chamber, each of the tubular elements of said fluid conduit being exposed to heating by radiation from said flames and hot gases and from said refractory side walls, the adjacent tubes in each of said rows being connected at their opposite ends in series, the tube at one end of the central row being connected to the adjacent end tube of one of the outer rows and the tubes at the opposite ends of said outer rows being interconnected.

3. A heater for fluids comprising, in combination, refractory side and end end walls defining a combustion and heating chamber, a fluid conduit comprising three vertically parallel rows of horizontal tubes disposed substantially midway between said walls within said chamber, and means for directing flames and hot gases resulting from the combustion of fuel over the inner surfaces of said refractory side walls in a substantially vertical direction through said chamber, each of the tubular elements of said fluid conduit being exposed to heating by radiation from said flames and hot gases and from said refractory side walls, adjacent tubes in each of said rows being connected at their opposite ends in series, the tube at one end of the central row being connected to the adjacent end tube of one of the outer rows and the tube at the opposite end of said outer row being connected with the tube most remote therefrom in the other outer row.

4. A heater for fluids comprising, in combination, refractory side and end walls defining a combustion and heating chamber, a fluid conduit comprising three vertically parallel rows of horizontal tubes disposed substantially midway between said walls within said chamber, and means for directing flames and hot gases resulting from the combustion of fuel over the inner surfaces of said refractory side walls in a substantially vertical direction through said chamber, each of the tubular elements of said fluid conduit being exposed to heating by radiation from said flames and hot gases and from said refractory side walls, adjacent tubes in one of the outer rows being connected at their ends in series, adjacent tubes in the other two rows being interconnected for the series flow of fluid through both of the last named rows, and the tube at one end of the first named outer row being connected with the adjacent end tube of the central row.

MARION W. BARNES.